United States Patent [19]

Kono et al.

[11] 4,216,280
[45] Aug. 5, 1980

[54] GLASS FIBER SEPARATOR FOR STORAGE BATTERIES

[75] Inventors: Migaki Kono; Hideaki Igarashi; Kenjiro Kishimoto, all of Takatsuki, Japan

[73] Assignee: Yuasa Battery Company Limited, Takatsuki, Japan

[21] Appl. No.: 48,902

[22] Filed: Jun. 15, 1979

Related U.S. Application Data

[63] Continuation-in-part of Ser. No. 889,958, Mar. 24, 1978, abandoned.

[30] Foreign Application Priority Data

Sep. 19, 1977 [JP] Japan ................................ 52-112883

[51] Int. Cl.$^2$ ............................................. H01M 2/16
[52] U.S. Cl. ..................................... 429/247; 429/252
[58] Field of Search ............... 429/247, 248, 249, 250, 429/251, 252

[56] References Cited

U.S. PATENT DOCUMENTS

| | | | |
|---|---|---|---|
| 2,117,371 | 5/1938 | Slayter | 429/251 |
| 2,734,095 | 2/1956 | Mears et al. | 429/252 |
| 3,085,126 | 4/1963 | Labino | 429/247 |
| 3,103,461 | 9/1963 | Smith et al. | 429/252 |
| 3,862,861 | 1/1975 | McClelland et al. | 429/252 |

Primary Examiner—Donald L. Walton
Attorney, Agent, or Firm—Watson, Cole, Grindle & Watson

[57] ABSTRACT

Separators for storage batteries, particularly separators for sealed lead-acid storage batteries, comprise glass fibers entangled in the shape of a sheet without the use of a binder, a first portion being glass fibers having a fiber diameter smaller than 1 micron and a second portion being glass fibers having a fiber diameter larger than 5 microns, preferably larger than 10 microns, as well as an average fiber length of at least 5 mm. The inventive separators have high electrolyte retention, good mechanical strength, and good shape recovery.

5 Claims, 7 Drawing Figures

GLASS FIBER SEPARATOR FOR STORAGE BATTERIES

CROSS-REFERENCE TO RELATED APPLICATION

The present application is a continuation-in-part application of application Ser. No. 889,958, filed Mar. 24, 1978, now abandoned.

BACKGROUND OF THE INVENTION

The present invention relates to separators for storage batteries, and more particularly to separators for sealed lead-acid storage batteries.

Various kinds of separators for storage batteries made of glass fibers have been proposed, for example, as shown in U.S. Pat. Nos. 3,085,126 and 3,862,861. However, such separators have been inadequate for use in storage batteries, particularly sealed lead-acid storage batteries. For example, the separator disclosed in U.S. Pat. No. 3,085,126 has pore diameters so large as to invite a short-circuit between the negative and positive plates and the amount of binder used is so excessive as to contaminate the negative plate. Further, the separator disclosed in U.S. Pat. No. 3,862,861 is so low in mechanical strength that special precautions are needed when handling it. It should be noted that in a sealed lead-acid storage battery, an electrolyte in an amount which is not so excessive as to be fluid must be retained in the micropores of a glass fiber separator, otherwise, due to oxygen and hydrogen gases being generated at the end of the charging operation for the storage battery, the electrolyte will leak out and elevate the concentration in the cells. As a result, the performance and the service life of the storage battery will be impaired. Therefore, separators for storage batteries are needed which can not only absorb very high amounts of electrolyte, but which will have high electrolyte retention, and which will have many micropores of a small diameter. Furthermore, it is important that the separator be easy to handle for ease in assembling the storage battery. Therefore, it must be comparatively high in mechanical strength. Finally, separators for storage batteries should be advantageously made of cheap materials.

The present invention is directed to a separator which satisfies these various requirements.

Thus, a first object of the present invention is to provide a separator for storage batteries which has favorable performance characteristics and a long service life.

A second object of the present invention is to provide a separator for storage batteries which has a very high electrolyte retention, and which has many micropores of a small diameter.

A third object of the present invention is to provide a separator for storage batteries which has a high mechanical strength, which is easy to handle during assembling of the storage battery, and is cheap to produce.

A fourth object of the present invention is to provide a separator for storage batteries which does not contaminate the negative plate and can considerably prolong the life of the storage batteries in which they are used.

SUMMARY OF THE INVENTION

According to the present invention the storage battery separators comprise a sheet of entangled glass fibers, one portion being glass fibers having a fiber diameter smaller than 1 micron, and a second portion being glass fibers having a fiber diameter larger than 5 microns, preferably larger than 10 microns, as well as an average fiber length of at least 5mm. No binder ingredient of any type is contained in the entangled glass fiber sheet.

The present invention will be more easily understood with reference to the following drawings and description.

BRIEF DESCRIPTION OF THE DRAWINGS

In the drawings, FIG. 1 schematically shows a part of a separator for a storage battery consisting of various kinds of glass fibers and having different fiber diameters, the glass fibers being microscopically magnified.

DETAILED DESCRIPTION OF THE PREFERRED EMBODIMENTS

The separator for storage batteries of the present invention is characterized in that first glass fibers having a fiber diameter smaller than 1 micron and second glass fibers having a fiber diameter larger than 5 microns, preferably larger than 10 microns, and an average fiber length of at least 5 mm or longer, are entangled with each other to be in the shape of a sheet, the sheet being formed into a useful product without application of or the need for a binder.

The first feature of the present invention is that the separator is formed with a base of first glass fibers having a fiber diameter smaller than 1 micron. In this regard, a separator consisting of only glass fibers of very fine fiber diameter, i.e., smaller than 1 micron, is most adapted for sealed lead-acid storage batteries; however, such a separator is comparatively low in mechanical strength and therefore has various defects: It is not easy to handle, it is very difficult to assemble within the storage battery, and it utilizes fine glass fibers which are very costly. Thus, a second feature of the invention involves mixing glass fibers having a fiber diameter larger than 5 microns, preferably larger than 10 microns, with these first glass fibers, in order to form a cheap separator for storage batteries which is very high in the mechanical strength. The amount of glass fibers having a fiber diameter smaller than 1 micron must be 50 to 95% by weight and the amount of second glass fibers is 50 to 5% by weight, based on the weight of the entire separator for storage batteries. When the amount of first glass fibers is less than 50% by weight, the microporosity of the separator will be lost, the amount of the retained electrolyte and electrolyte retention will be remarkably reduced, and the separator will be unsatisfactory as a separator for sealed lead-acid storage batteries. On the other hand, when the amount of first glass fibers is more than 95% by weight, a cheap separator will not be obtained, and the mechanical strength of the separator will be very low, i.e., since the amount of the second glass fibers thicker than 5 microns, preferably thicker than 10 microns, is too low.

Next, it is quite advantageous to utilize glass fibers having a fiber diameter of 10 to 30 microns as part of the second glass fibers component having a fiber diameter larger than 5 microns, preferably larger than 10 microns. Such fibers have advantages in that they are not only cheap, but they are also more improved in mechanical strength and they provide the separator with better characteristics.

One of the important features of the storage battery separator of the present invention resides in the fact that no binder is used. In lead-acid batteries the binder is oxidized by the $Pb_2O$ used for the positive plate so that it is dissolved in the electrolyte and deposited on the negative plate, thereby resulting in an inability to charge the negative plate. Therefore, the separator used particularly for sealed lead-acid storage batteries is designed to absorb oxygen gas with the negative plate. Thus, the negative plate must be prevented, as far as possible, from being contaminated. The conventional separators made of fine glass fibers have employed a binder to obtain a necessary mechanical strength for assembling the batteries, i.e., since they do not employ the second glass fibers of the present invention having a fiber diameter larger than 5 microns, preferably larger than 10 microns, and a fiber length of at least 5mm or longer. The storage battery separator of the present invention which includes the noted second glass fibers does not employ a binder so the negative plate is never contaminated. Therefore, the separator of the present invention is best suitable for lead-acid storage batteries, particularly sealed lead-acid storage batteries.

Further, in order to additionally improve the mechanical strength of the storage battery separator, sheet-forming organic fibrous materials can be added to the glass fibers. Such materials include synthetic resin fibers such as polyester, polypropylene or acrylonitrile fibers, or such natural fibers as of cellulose. The latter natural fibers are better in that they are high in dispersibility, have many branches, and are easy to entangle. If the amount of the organic fibrous materials is less than 0.1% by weight, there will be no reinforcing effect; whereas, if it is more than 5% by weight, the electrolyte retention will be reduced and the entangled sheet product will not be functional as a separator for storage batteries. Therefore, the range of 0.1 to 5% by weight of said added fibers, based on the weight of the entire separator, is preferable and advantageous.

The next feature of the present invention is that the average fiber length of the second glass fibers of a fiber diameter larger than 5 microns, preferably larger than 10 microns, is at least 5 mm or larger. This feature has the advantage of greatly improving the mechanical strength and shape recovery of the storage battery separator. If the average fiber length is less than 5 mm, the number of the fibers entangled with the other fibers will decrease and the reinforcing effect will be remarkably reduced.

The present invention will now be explained in greater detail with reference to the following examples.

EXAMPLE 1

Figure 1:
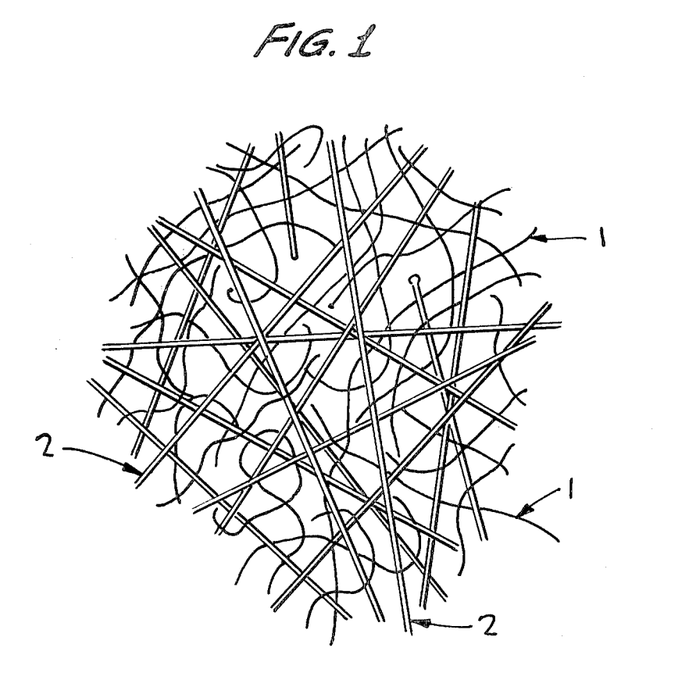

As shown in FIG. 1, 70% by weight of first glass fibers 10 having a fiber diameter of 0.5 micron and 50% by weight of second glass fibers 20 having a fiber length cut to be 10 mm and a fiber diameter of 11 microns were uniformly dispersed in water at a concentration of 0.5 part by weight fiber to 100 parts by weight of water, and were then sheet-formed by an ordinary paper making method, and without any addition of binder. The sheet product was dehydrated and dried to obtain a separator for storage batteries of the present invention. The obtained separator made in accordance with this invention was then compared with a conventional storage battery separator made by utilizing glass fibers thinner than 1 micron, and the results are shown in Table 1. In the Table, it is seen that both separators satisfy the characteristics of a sealed lead-acid storage battery but the separator of the present invention is far superior to the conventional separator, particularly in mechanical strength and shape recovery.

Table 1

| Characteristics | Separator of the present invention | Conventional separator |
|---|---|---|
| Maximum pore diameter (microns) | 19.0 | 23.0 |
| Tensile strength (kg/cm$^2$) | 9.8 | 2.5 |
| Amount of retained electrolyte ($H_2SO_4$ c.c./dry sepa.c.c.) | 2.9 | 3.1 |
| Electrolyte retention (%) | 97 | 95 |
| Shape recovery (%) | 95 | 70 |

Notes re testing methods:
1. Maximum pore diameter

The maximum pore diameter of the separator of the present invention is smaller than that of the conventional separator which shows that the separator of the present invention has a comparatively small pore diameter and is very effective in preventing short-circuiting when arranged between positive and negative plates.

2. Tensile strength

The tensile strength is shown as a mechanical strength. The separator of the present invention is about 4 times as high as the conventional separator in tensile strength, which indicates that it is very easy to handle when handling it in the course of assembling the ultimate storage battery.

3. Amount of retained electrolyte

A test piece of the separator was dipped in an electrolyte consisting of sulfuric acid of a specific gravity of 1.30 and removed. After a lapse of 5 minutes, the amount of electrolyte and the dried volume of the test piece were measured. The amount of the retained electrolyte is a value obtained by dividing the former value by the latter. The separator of the present invention is not too different from the conventional one in the amount of retained electrolyte, which indicates that it is well applicable for use in sealed lead-acid storage batteries.

4. Electrolyte retention

A test piece of separator was dipped in an electrolyte consisting of sulfuric acid of a specific gravity of 1.30, removed, and then held under an acceleration of 6G for 30 seconds. Then the amount of electrolyte remaining in the test piece and the initial amount of the electrolyte before the test were measured. The electrolyte retention is a value shown in % of the amount of the former to the latter. The separator of the present invention is higher than the conventional one in electrolyte retention, which indicates it is adapted for use in a sealed lead-acid storage battery, i.e., even when subjected to external vibrations and shocks, the electrolyte can be expected to be comparatively well retained in the micropores of the separator.

5. Shape recovery

First, the thickness $T_1$ of the test piece of the separator under a load of 5kg/dm$^2$ was measured. Then a load of 20kg/dm$^2$ was applied to the test piece for 1 minute. And then the thickness $T_2$ of the test piece of the separator under a load of 5 kg/cm$^2$ was measured. The shape recovery is a value indicated in % by dividing $T_2$ by $T_1$. The separator of the present invention is much higher than the conventional one in shape recovery. As is well known, a battery element consisting of positive and negative plates and separators is contained in a battery under a fixed pressure, but if the shape recovery of the separator is poor, the completed battery will not develop its pressurized condition and, as a result, there will be a detrimental influence on the performance and life of the storage battery. The separator of the present invention is so high in shape recovery as to have the advantage of improving the performance and life of the battery.

EXAMPLE 2

Figure 2:
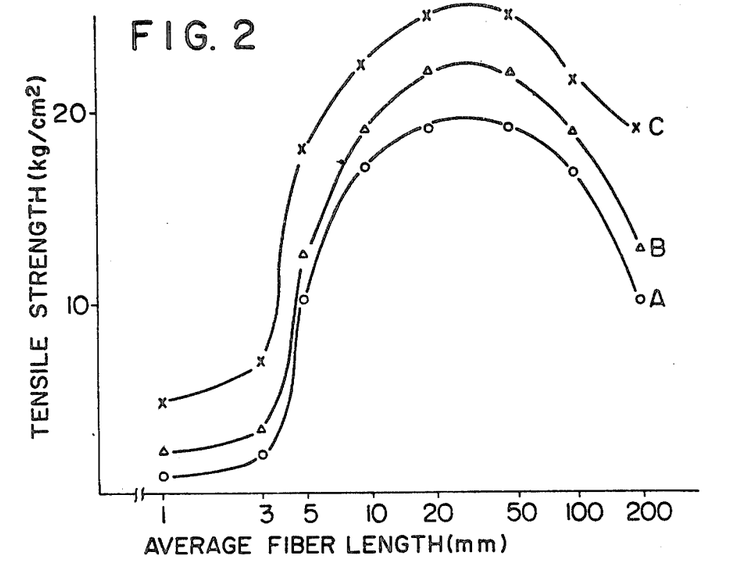
FIG. 2 is a curve diagram showing the tensile strengths of various kinds of separators for storage batteries consisting of sheets of entangled glass fibers, all the sheets being formed of glass fibers having fiber diameters larger than micron but differing average fiber lengths.
Figure 3:
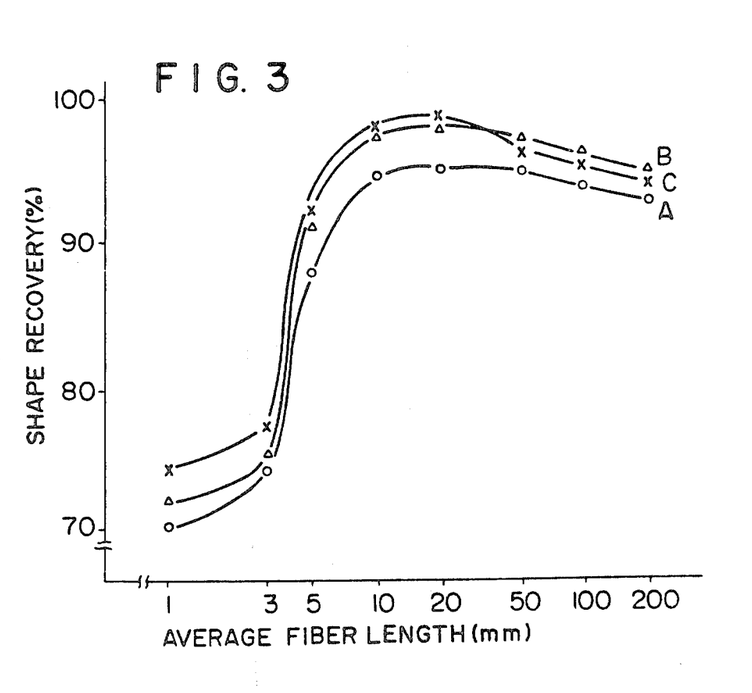
FIG. 3 is a curve diagram showing the shape recoveries for the various separators for storage batteries shown in FIG. 2.

Respective glass fibers of average fiber lengths of 1, 3, 5, 10, 20, 50, 100 and 200mm and a fiber diameter of 6 microns were prepared in advance. 80% by weight of glass fibers of a fiber diameter of 0.75 micron and 20% by weight of each of the above-mentioned respective glass fibers were dispersed in water and were then treated in the same manner as in Example 1 to obtain 8 separate separators for storage batteries. Their tensile strengths and shape recoveries are shown by curves A in FIGS. 2 and 3. In FIG. 2 the ordinate denotes the tensile strength (kg/cm$^2$) and the abscissa denotes the average fiber length (mm). In FIG. 3, the ordinate denotes the shape recovery (%) and the abscissa denotes the average fiber length (mm).

EXAMPLE 3

Respective glass fibers of average fiber lengths of 1, 3, 5, 10, 20, 50, 100 and 200mm and a fiber diameter of 13 microns were prepared in advance. 85% by weight of glass fibers of a fiber diameter of 0.5 micron and 15% by weight of each of the above-mentioned respective fibers were dispersed in water and were then treated in the same manner as in Example 1 to obtain 8 separate separators for storage batteries. Their tensile strengths and shape recoveries are shown by curves B in FIGS. 2 and 3.

EXAMPLE 4

The fibers of the same average fiber lengths and fiber diameters as in Example 2 were dispersed to the same extent in water. One part by weight of natural cellulose made from Manila hemp as a raw material was mixed in 100 parts by weight of the glass fibers to obtain 8 separate separators in the same manner as in Example 1. Their tensile strengths and shape recoveries are shown by curves C in FIG. 2 and 3.

EXAMPLE 5

Figure 4:
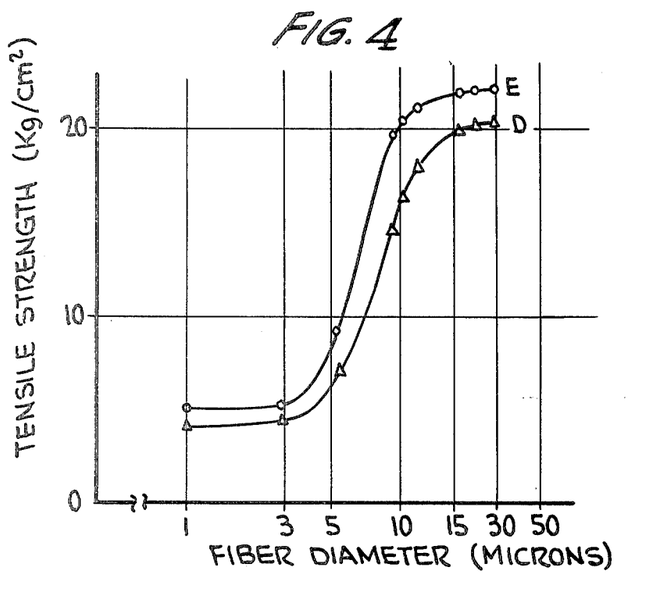
FIG. 4 is a curve diagram showing the variation of tensile strengths for the inventive glass fiber-entangled separators when the fiber diameter of the second glass fibers (which have a fiber length of at least 5 mm or longer) is varied.

Glass fibers having respectively fiber diameters of 1, 3, 6, 9, 11, 13, 16, 19 and 30 microns were cut to be 15 mm long. 25% by weight of each of the above-mentioned respective glass fibers and 75% by weight of glass fiber having a fiber diameter of 0.75 micron were uniformly dispersed in water and were then treated in the same manner as in Example 1 without application of a binder to obtain 9 kinds of sheet-shaped separators for storage batteries. The tensile strengths and shape recoveries of these 9 separate separators for storage batteries are shown in FIG. 3 and by a curve D in FIG. 4. In FIG. 3, the ordinate denotes the tensile strength (kg/cm$^2$) and the abscissa denotes the fiber diameter (micron). In FIG. 4, the ordinate denotes the shape recovery (%) and the abscissa denotes the fiber diameter (micron).

EXAMPLE 6

Glass fibers having respectively fiber diameters of 1, 3, 6, 9, 11, 16, 19 and 30 microns were cut to be 10 mm long. 15% by weight of each of the above-mentioned respective glass fibers and 85% by weight of glass fibers having a fiber diameter of 0.5 micron were uniformly dispersed in water and were then treated in the same manner as in Example 1 without application of a binder to obtain 9 separate sheet-shaped separators for storage batteries. The tensile strengths and shape recoveries of these 9 separators are shown in FIG. 3 and a curve E in FIG. 4.

EXAMPLE 7

50% by weight of glass fibers having a fiber diameter of 0.5 micron, 40% by weight of glass fibers having a fiber diameter of 6 microns and a fiber length of 11mm and 10% by weight of glass fibers having a fiber diameter of 11 microns and a fiber length of 11 mm were uniformly dispersed in water and were treated in the same manner as in Example 1 without application of a binder to obtain a sheep-shaped separator for storage batteries.

Table 2 shows the characteristics of thus obtained separator as compared with the conventional one of Example 1.

Table 2

| Characteristics | Separator of the present invention (Example 7) | Conventional separator (Example 1) |
| --- | --- | --- |
| Maximum pore diameter (microns) | 20.8 | 23 |
| Tensile strength (kg/cm$^2$) | 11.5 | 2.5 |
| Amount of regained electrolyte (H$_2$SO$_4$c.c./dry sepa. c.c.) | 2.5 | 3.1 |
| Electrolyte retention | 96 | 95 |
| Shape recovery (%) | 90 | 70 |

In the respective separators represented by curves A, B and C in the above-described respective examples, when the average fiber length is less than 5 mm, no reinforcing effect is seen at all. It is well understood from FIG. 2 that in case the average fiber length is at least 5 mm or larger, the mechanical strength of the separator will be greatly improved, because if the average fiber length is less than 5 mm, the number of entanglements with other glass fibers will decrease and no reinforcing action will appear. In the case of FIG. 3, too, if the average fiber length is less than 5 mm, the shape recovery will be remarkably reduced.

Figure 5:
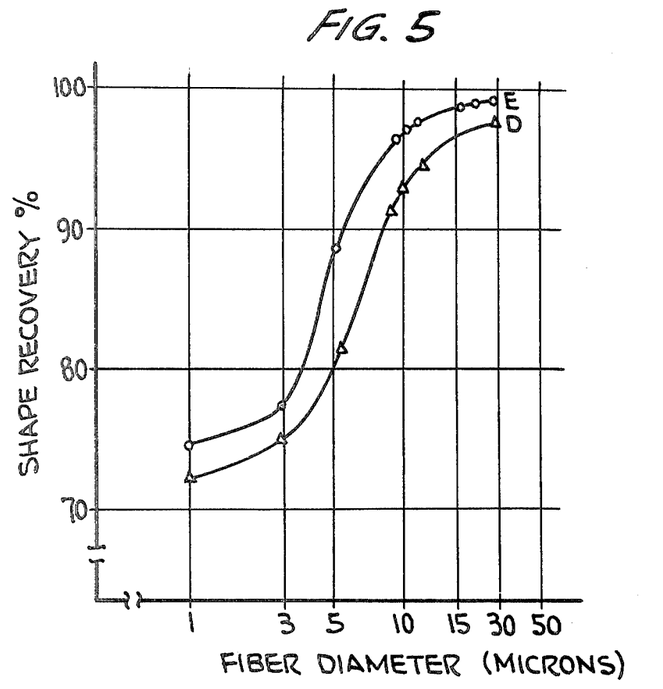
FIG. 5 is a curve diagram showing the variation in shape recovery for the various separators for storage batteries shown in FIG. 4.

As shown by the curve D in FIG. 4 and the curve E in FIG. 5, the fiber diameter of the second glass fibers having a fiber length of at least 5 mm or longer must be larger than 5 microns, preferably larger than 10 microns, because if the fiber diameter of the second glass fibers is smaller than 5 microns, the rigidity of the fibers will become so low that the reinforcing effect may be considerably reduced. Since the second glass fibers having a fiber diameter larger than 5 microns and a fiber length of at least 5mm or longer can provide the separator with such an excellent mechanical strength, no binder is needed to maintain the integrity of the entangled glass fiber separator.

EXAMPLE 8

The respective amounts of 100, 95, 90, 80, 65, 50 and 40% by weight of glass fibers having a fiber diameter of 0.75$\mu$ and the respective amounts of 0, 5, 10, 20, 35, 50 and 60% by weight of glass fibers having a fiber diameter of 13$\mu$ were uniformly dispersed in water and treated in the same manner as in Example 1 without any binder to obtain 7 separate separators.

Figure 6:
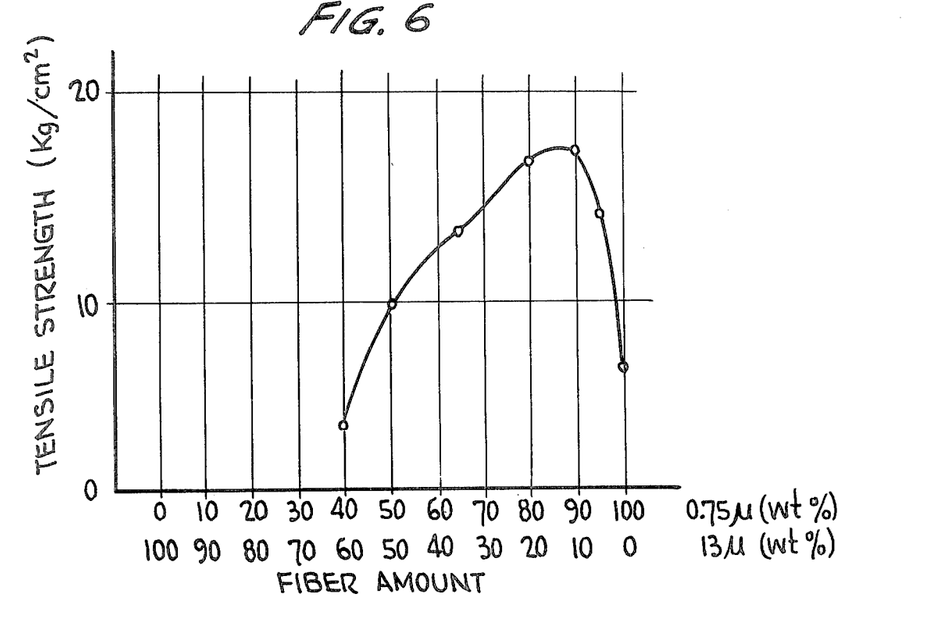
FIG. 6 is a curve diagram showing the relationship between the tensile strength of storage battery separator and the ratio of different fiber diameters of entangled glass fibers.
Figure 7:
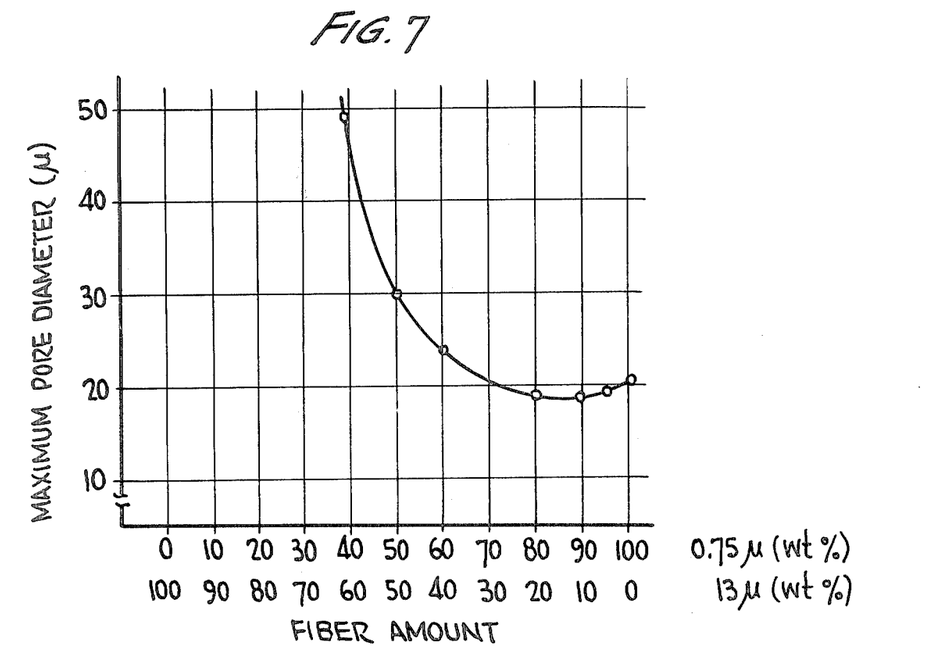
FIG. 7 is a curve diagram showing the relationship between the maximum pore diameter of the separators and the ratio of different fiber diameters in the separators of FIG. 6.

The mechanical strength and maximum pore diameter of these separators are as shown in FIG. 6 and 7. In FIG. 6, the ordinate denotes the tensile strength (kg/cm$^2$) and the abscissa denotes the amounts (% by weight) of glass fibers having different diameters. As can be seen from Example 7 and FIG. 6 and 7, the amount of glass fiber having a fiber diameter smaller than 1 micron is preferably 50 to 95% by weight. If the amount of glass fiber having a fiber diameter smaller than 1 micron is less than 50% by weight, the mechanical strength of the separator will be low, the pore diameter thereof will become excessively large and its electrolyte retention will be reduced. Therefore, the storage battery will be difficult to assemble and the performance thereof will also be reduced. Particularly with respect to sealed lead-acid storage batteries, if the electrolyte retention of the separator is reduced, the electrolyte at the time of charging will be considerably lost and the specific gravity the electrolyte will be increased, thus resulting in a shortening of the life of the storage battery. Consequently, the maximum pore diameter of the separator made predominantly of glass fibers is preferably smaller than 40 microns and the amount of glass fibers having a fiber diameter smaller than 1 micron must be more than 50% by weight. Further, the amount of glass fibers having a fiber diameter smaller than 1 micron is preferably smaller than 95% by weight, because, as can be seen, from Example 7, if it is more than 95% by weight, the mechanical strength of the separator will be reduced and the cost thereof will be increased.

Thus, the storage battery separator of the present invention is so high in amount of retained electrolyte and in electrolyte retention that the resultant storage battery is favorable in performance and has a long service life. Further, the separator is so high in mechanical strength as to have various advantages: It is very easy to handle during assembling of the storage battery and it is comparatively cheap. it is adapted for use as a separator for sealed lead-acid batteries.

It is needless to say that the present invention can be variously modified in ways which do not deviate from the above-described examples, yet still be within the scope and spriits of the appended claims.

We claim:

1. A separator for storage batteries comprising a sheet of entangled glass fibers, said glass fibers including 50% to 95% by weight of first glass fibers having a fiber diameter of smaller than 1 micron and 5% to 50% by weight of second glass fibers having a fiber diameter of larger than 5 microns and a fiber length of at least 5mm, said sheet including no binder.

2. The separator for storage batteries according to claim 1 wherein said second glass fibers having a fiber diameter of larger than 5 microns and a fiber length of at least 5 mm include glass fibers having a fiber diameter of 10 to 30 microns.

3. The separator for storage batteries according to claim 1 including organic fibrous materials in a range of from 0.1% to 5% by weight.

4. The separator for storage batteries according to claim 3 wherein said organic fibrous materials are natural fibrous materials.

5. The separator for storage batteries according to claim 2 including organic fibrous materials in a range of from 0.1% to 5% by weight.

* * * * *

UNITED STATES PATENT OFFICE
CERTIFICATE OF CORRECTION

PATENT NO. : 4,216,280                          Page 1 of 2

DATED : August 5, 1980

INVENTOR(S) : Kono et al

It is certified that error appears in the above-identified patent and that said Letters Patent are hereby corrected as shown below:

Column 2, line 18: After "than" insert --1--

Column 4, line 9: Cancel "10" and insert --1-- lines 9-10: Cancel "50% by weight of second glass fibers" and insert --30% by weight of second glass fibers-- line 10: Cancel "20" and insert --2--

Column 5, line 18: Cancel "5 Kg/cm$^2$" and insert --5 Kg/dm$^2$--

Column 6, line 13: Cancel "in FIG. 3 and by a curve D in FIG. 4" and insert --by a curve D in FIGS. 4 and 5-- line 14: Cancel "FIG.3" and insert --FIG. 4-- line 16: Cancel "(micron)" and insert --(microns)--; and cancel "FIG. 4" and insert --FIG. 5-- line 18: Cancel "(micron)" and insert --(microns)--

UNITED STATES PATENT OFFICE
CERTIFICATE OF CORRECTION

PATENT NO. : 4,216,280
DATED : August 5, 1980
INVENTOR(S) : Kono et al

It is certified that error appears in the above-identified patent and that said Letters Patent are hereby corrected as shown below:

Column 6, lines 30-31: Cancel "in FIG. 3 and a curve E in FIG. 4" and insert --by a curve in FIGS. 4 and 5--

In Table 2 cancel "Amount of regained" and insert --Amount of retained--

Column 7, lines 8-9: Cancel "in FIG. 4 and the curve E in FIG. 5," and insert --and E in FIGS. 4 and 5,--

Signed and Sealed this

Second Day of March 1982

[SEAL]

Attest:

Attesting Officer

GERALD J. MOSSINGHOFF

Commissioner of Patents and Trademarks